United States Patent Office 3,299,014
Patented Jan. 17, 1967

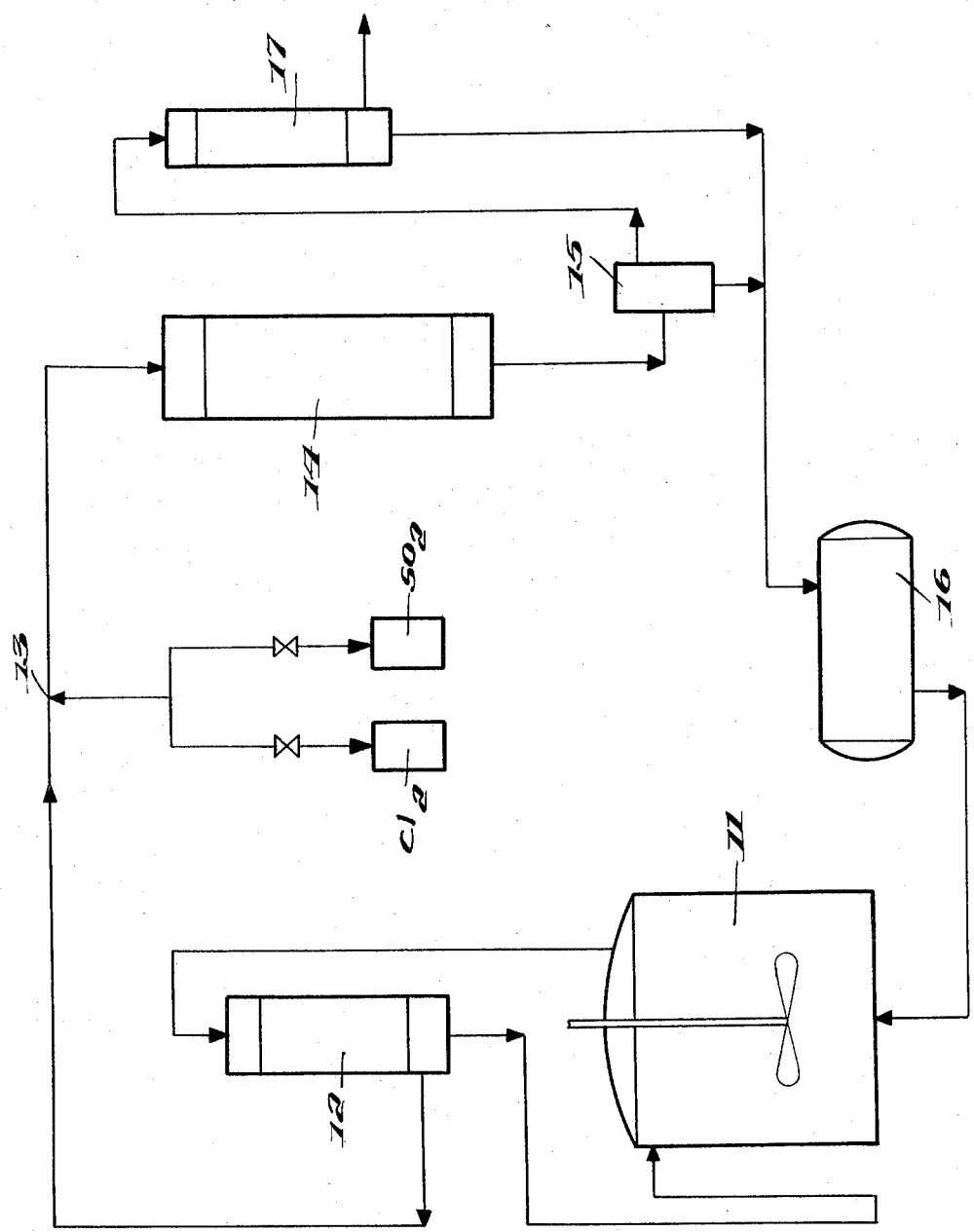

3,299,014
PROCESS FOR CHLOROSULFONATING OLEFINIC HYDROCARBON POLYMERS USING SULFURYL CHLORIDE
James Kalil, Wilmington, Del., assignor to E. I. du Pont de Nemours and Company, Wilmington, Del., a corporation of Delaware
Filed Aug. 19, 1964, Ser. No. 391,364
7 Claims. (Cl. 260—79.3)

This application is a continuation-in-part of my copending application Serial No. 237,133, filed November 13, 1962, now abandoned.

This invention relates to a process for treating olefinic hydrocarbon polymers with sulfuryl chloride and, more particularly, to the chlorination and chlorosulfonation of ethylene polymers and the like.

It is known in the art to treat olefin polymers with chlorine and/or a mixture of chlorine and sulfur dioxide to produce chlorinated or chlorosulfonated polymers. These techniques, however, have certain undesirable features which add to the cost of the treatment processes, e.g., the gases cannot be rapidly dissolved in the viscous reaction medium unless the latter is much diluted, and this increases the cost of solvent recovery and requires increased capacity for the equipment used for making the product and isolating it from the solution; a large proportion of the sulfur dioxide and a smaller proportion of the chlorine remains unreacted and it is generally impractical to separate them from the by-product hydrogen chloride; and difficult mixing conditions and the large heat of reaction often limits the capacity of the equipment.

Many of these undesirable factors are overcome by treating the polymers with sulfuryl chloride, especially in the presence of free-radical catalysts such as organic peroxides and azo bisnitriles and by the presence of oxygen and light, especially ultraviolet light (see U.S. Patents 2,405,971, 2,503,252, and 2,586,363). If certain tertiary amines and certain sulfhydryl compounds are present, the chlorosulfonation reaction is greatly enhanced [see Karasch et al., J. Am. Chem. Soc. 61, 2142, 3089 and 2432 (1939)]. However, when sulfuryl chloride is used either for chlorination or chlorosulfonation the off-gas from the reaction contains substantial amounts of sulfur dioxide and HCl as well as some solvent vapor. The presence of the latter two constituents in the off-gas has discouraged efficient use of this off-gas and has resulted in its being discarded.

It has been unexpectedly found that the off-gas from this process can be efficiently reused to prepare more sulfuryl chloride despite the normally undesirable presence of the hydrogen chloride and solvent vapors. The description of the invention will be facilitated by reference to the accompanying drawing wherein the figure schematically illustrates a preferred embodiment of the novel process.

With reference to the drawing, the olefin polymer, solvent and catalyst is charged into reactor 11 which represents a glass-lined reactor designed to operate at 25 p.s.i.g. pressure. The reactor is provided with an agitator, a jacket for heating and cooling and the usual facilities for introducing and withdrawing liquids and gases. The sulfuryl chloride is introduced from storage into reactor 11 and the off-gas is conducted into a reflux condenser 12 from which condensate is returned to reactor 11 and the off-gas, containing $SO_2$ and HCl as well as some solvent vapor, is removed and mixed with the required amounts of filtered $Cl_2$ and sulfur dioxide at 13 from which point the mixture is conducted to tubular reactor 14 where most of the sulfur dioxide and chlorine are converted to sulfuryl chloride. This reaction is favored at temperatures below 75° C. and is almost complete at 25° C. In practice it is convenient to mix the chlorine with the off-gas at temperatures below 75° C., preferably below about 35° C. The reaction proceeds exothermically and reactor temperatures up to about 100° C. may result. It is desirable to cool the reactor to remove as much of the heat of reaction as possible. In addition to merely adding enough chlorine to react with all the sulfur dioxide in the off-gas, enough additional sulfur dioxide can be added at 13 which together with sufficient chlorine will form sulfuryl chloride equivalent to the amounts used in reactor 11.

The effluent from tubular reactor 14 is sent to separator 15 where liquid sulfuryl chloride is sent to temporary storage tank 16. The unliquefied gas in separator 15 may be passed through a second brine-cooled reactor 17 in which more sulfuryl chloride is formed at about −10° C. and sent to tank 16 and uncondensed gases (e.g. HCl) are vented or otherwise disposed of. The sulfuryl chloride stored in tank 16 may then be used for the reaction in reactor 11 as described above.

The invention will now be further described in and by the following examples wherein parts and percentages are by weight unless otherwise indicated.

*Example I*

This example will be described in relation to the process and apparatus of the drawing described above.

A solution of 8.5 parts by weight of linear polyethylene (density 0.958, melt index 4) in 110 parts by weight of carbon tetrachloride is prepared in the reactor 11, at 110° C. under nitrogen. After adding 0.0043 part of pyridine, 0.96 part of azodiisobutyronitrile along with 16.4 parts of sulfuryl chloride are introduced from storage tank 16 and added over a period of about 1 hour with agitation. The reaction proceeds at 25 p.s.i.g. pressure and starts at about 110° C. The vapors from the reactor 11 are partly condensed in 12 at 35° C. to 3.3 parts of carbon tetrachloride, containing 0.03 part of hydrogen chloride and 0.1 part of sulfur dioxide. This is returned to the reactor. The uncondensed vapor phase consists of 1.6 parts of hydrogen chloride, 2.8 parts of sulfur dioxide, and 1.2 parts of carbon tetrachloride. This vapor is mixed with 2.6 parts of chlorine and passed through the tubular reactor 14 at a low temperature of 44° C. containing activated charcoal, which converts most of the chlorine and sulfur dioxide to sulfuryl chloride. Separation of the liquid phase from the reaction product in separator 15 gives 15.9 parts of sulfuryl chloride with 3.3 parts of carbon tetrachloride plus small amounts of hydrogen chloride, chlorine and sulfur dioxide. This liquid is stored in tank 16 for reuse. The vapor phase is vented to the atmosphere in the laboratory demonstration. On a plant scale, it is sent to second reactor 17, containing activated charcoal, maintained at −10° C., in which more sulfuryl chloride is formed and sent to storage.

The chlorosulfonated polyethylene reaction mass in reactor 11 is worked up in the usual manner by reducing the pressure to remove residual gas and then evaporating the solution on a system of rotating drums, internally heated to 100–200° C., thus giving a reticulate sheet of chlorosulfonated polyethylene, substantially free of solvent, as described in U.S. Patent 2,923,979. The resulting product contained 33.4% chlorine and 0.94% sulfur and is practically identical in plasticity and working properties and in physical properties in the cured state with a chlorosulfonated polyethylene made from the same polyethylene and containing the same amounts of chlorine and sulfur, made by the use of chlorine and sulfur dioxide, rather than sulfuryl chloride, by the usual method described in U.S. Patent 2,982,759.

*Example II*

Example I is repeated, using 3 parts of the same polyethylene, 6 parts of sulfuryl chloride (produced from a previous run) 0.33 part of the azo catalyst and 0.0026 part of quinoline (instead of pyridine), in 40 parts of carbon tetrachloride. A chlorosulfonated product is obtained very similar to that produced in Example I.

*Example III*

A branched polyethylene of density 0.920 and a melt index 10, and made at high pressure with a free-radical catalyst, is used in place of the linear polyethylene of Example I. A solution of conveniently low viscosity is made by dissolving 9 parts in only 45 parts of carbon tetrachloride. Azodiisobutyronitrile (0.02 part) and pyridine (0.002 part) are used, with sulfuryl chloride derived from 3.2 parts of sulfur dioxide and 7.1 parts of chlorine. There is, therefore, an excess of 3.55 parts of chlorine. Only reactor 14 operating at 35° C. is used for making the sulfuryl chloride and sulfuryl chloride vapor, sulfur dioxide, and chlorine escaping from this reactor are not recovered. A satisfactory chlorosulfonated product containing 0.5% sulfur is obtained.

*Example IV*

A branched chain polyethylene such as that used in Example III (20 parts by weight) is dissolved in toluene (30 parts) at 80° C. Using 0.02 part of azo-bis-isobutyronitrile and 0.002 part of pyridine as catalysts, 36.2 parts of sulfuryl chloride is added to the agitated solution over a period of 30 minutes. The formation and recovery of sulfuryl chloride and the isolation of the product are carried out as in the preceding examples. A satisfactory product containing 41.2% chlorine and 2.0% sulfur is obtained. The chlorination of the toluene is less than 1%.

*Example V*

A polyethylene such as that used in Example I (14.1 parts by weight) is dissolved in 181.5 parts of carbon tetrachloride. The system is pressured with air at 25 p.s.i.g. pressure and is heated to 110° C. by applying steam to the jacket. A total of 0.0205 part of azo-diisobutyronitrile as a dilute solution and 30.8 parts of sulfuryl chloride are introduced with agitation and with the temperature maintained at 110° C. The sulfur dioxide in the off-gas is converted to sulfuryl chloride for reuse as in Example I. A satisfactory product is isolated as in Example I containing 25.2% chlorine. The product contains substantially no sulfur since no pyridine is used.

*Example VI*

Example I is repeated, except the solution of solid linear polyethylene in carbon tetrachloride is replaced with a solution containing about 5% of linear polyethylene in benzene produced generally according to the teachings of U.S. Patents 2,862,917 and 2,978,442 as follows:

Ethylene gas, with carbon dioxide and water removed, is passed into a heat exchanger supplied with a refrigerant, where it liquefies. The liquid ethylene is passed through a feed pump under pressure, mixed with purified benzene and fed to a polyethylene reactor at a rate of 3.38 parts per hour and 22 parts per hour respectively. Titanium tetrachloride is also introduced into this reactor feed stream at the rate of 17.4 millimoles per hour. The reactor is maintained at 227° C. temperature and 2000 pounds per square inch pressure. The benzene is purified prior to mixing with the liquid ethylene, by pumping it through fixed beds of silica gel, and lithium aluminum hydride. In a separate stream, lithium aluminum tetradecyl is dissolved in a minimum of benzene and fed into the reactor at a rate of 22.4 millimoles of tetradecyl per hour. The reactor discharge is passed through a pressure let-down valve to a pressure of about 1350 p.s.i. and into a mixing vessel, into which is added per hour, 18.4 millimoles of 2-ethylhexanediol-1,3 in 10 parts of benzene. The reaction mixture is then passed through an adsorption column containing 8–14 mesh alumina which has been regenerated by a water treatment. The adsorption column is maintained at a pressure of 1350 p.s.i. and a temperature of 204° C. during the adsorption step. Unreacted ethylene is then removed, the solution is cooled to about 110° C., and fed to the reactor 11.

When benzene is used as the solvent, the off-gas from reactor 11 should be treated to reduce the benzene concentration to below 0.25 volume percent. This can be done by adding a second low temperature (e.g., −35° C.) condenser after condenser 12. The purified off-gas is then treated in reactor 14 and thereafter as in Example I.

This example describes a highly desirable method of making chlorosulfonated polyethylene economically and efficiently, starting with ethylene gas, and eliminating the necessity for isolating polyethylene per se. Further, the use of benzene as a solvent enables the ethylene polymerization and the subsequent chlorosulfonation to occur in the same solvent medium without undesirable side reactions taking place in either reaction.

The solvent used may be not only the conventional carbon tetrachloride but also other highly halogenated hydrocarbons such as chloroform, tetrachloroethylene, and trichlorofluoromethane. Furthermore, when no free chlorine is added, hydrocarbons, themselves, such as benzene, may be used as solvents for the reaction of the sulfuryl chloride with the olefin polymer. This reduces cost and allows the use of more concentrated solutions, as well as cheaper and less toxic solvents.

Although Example I illustrates a method for substantially complete utilization of the sulfur dioxide fed to the system, such refinements, although highly advantageous, are not essential. Thus, it is within the scope of the invention, as shown in Example III, to carry out the combination of sulfur dioxide and chlorine at temperatures, such as 35° C., at which it is incomplete, and to allow the uncondensed sulfuryl chloride to escape from separator 15 with the hydrogen chloride. Even with these losses, the utilization of sulfur dioxide is much higher than in the prior art methods.

Although this invention has been discussed mainly with reference to the typical polyethylene as starting material, what has been said applies to the other olefin polymers such as those of propylene, butylene, hexene, and the rest, as well as to copolymers of these as, for example, the copolymers of ethylene and propylene, which, along with polyethylene and polypropylene, are preferred starting materials.

As illustrated, the polymer may be of either branched or linear type. As to molecular weight, any olefin polymer known to be suitable for chlorination and chlorosulfonation by other methods may be used. Ordinarily, the olefin polymer will be a solid at room temperatures. The concentration of olefin polymer used will of course depend on its molecular weight but it should be particularly noted that much more concentrated solutions, up to 30% or more, may be used in the present invention.

When a linear polyethylene to be chlorosulfonated is polymerized in the same solvent (e.g., benzene) in which it will be chlorosulfonated (as in Example VI), it is preferred that the polymerization be conducted in the presence of a titanium compound/metal alkyl coordination catalyst, e.g., those of trivalent or tetravalent titanium alkoxides, salts and chlorides, and aluminum and lithium-aluminum alkyls such as disclosed in U.S. Patents 2,862,917 and 2,905,645.

The reaction of the polymer with sulfuryl chloride will usually be carried out between 30 and 150° C. and a suitable corresponding pressure, using a slight excess of sulfuryl chloride over the amount required to give the desired chlorine content, which will ordinarily be between 5 and 55%, preferably 20 to 35.

Thus, it will be seen that the present invention overcomes the stated disadvantages of the prior art by allowing easy mixing of the reactants, recovering the large proportions of sulfur dioxide formerly lost, and increasing the capacity of the equipment. Also, the process enables the convenient use of sulfuryl chloride while simultaneously effecting economies in the production of treated polymer.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. In a process for treating a polymer of a monoolefinic hydrocarbon with sulfuryl chloride which comprises: (1) reacting an organic solvent solution of said polymer with sulfuryl chloride, thereby forming an off-gas from the reaction containing sulfur dioxide and hydrogen chloride, the improvement which consists in (2) mixing said off-gas with chlorine and exothermically reacting the off-gas with the chlorine to form sulfuryl chloride, and (3) introducing the sulfuryl chloride formed in step (2) to the reaction of step (1).

2. In a process for treating a polymer of ethylene with sulfuryl chloride which comprises: (1) reacting a solvent solution of said polymer with sulfuryl chloride, thereby forming an off-gas from the reaction containing sulfur dioxide and hydrogen chloride, said solvent selected from the group consisting of hydrocarbon and chlorinated hydrocarbon solvents, the improvement which consists in (2) mixing said off-gas with chlorine at a temperature below about 35° C., and exothermically reacting the off-gas with chlorine at temperature below about 100° C. thereby forming sulfuryl chloride, and (3) introducing the sulfuryl chloride formed in step (2) into the reaction of step (1).

3. A process as defined in claim 2 wherein additional sulfur dioxide is added in step (2) together with an amount of chlorine equivalent to the total amount of sulfur dioxide.

4. In a process for preparing a chlorosulfonated polymer of a monoolefin which comprises (1) polymerizing said monoolefin in benzene solution in the presence of a titanium compound/metal alkyl coordination catalyst; (2) removing the coordination catalyst residue from the benzene solution of monoolefin polymer; (3) reacting said solution of monoolefin polymer with sulfuryl chloride to form chlorosulfonated monoolefin polymer, thereby forming an off-gas from the reaction containing sulfur dioxide and hydrogen chloride; the improvement which consists in (4) mixing said off-gas with chlorine at a temperature below 75° C. and exothermically reacting the off-gas with chlorine at a temperature below about 100° C. thereby forming sulfuryl chloride; and (5) introducing the sulfuryl chloride formed in step (4) to the reaction of step (3).

5. A process for preparing chlorosulfonated polyethylene which comprises: (1) polymerizing ethylene in benzene solution in the presence of a $TiCl_4$/lithium aluminum tetraalkyl coordination catalyst; (2) removing the coordination catalyst residue from the benzene solution of polyethylene; (3) reacting said polyethylene solution with sulfuryl chloride to form chlorosulfonated polyethylene, thereby forming an off-gas from the reaction containing sulfur dioxide, and hydrogen chloride and benzene vapor; (4) reducing the benzene vapor content of the off-gas below about 0.25 volume percent; (5) mixing said off-gas from step (4) with chlorine at a temperature below 75° C. and exothermically reacting said off-gas with chlorine at a temperature below about 100° C. thereby forming sulfuryl chloride; and (6) introducing the sulfuryl chloride formed in step (5) into the reaction of step (3).

6. In a sulfuryl chloride-reaction process using sulfuryl chloride in an organic solvent solution forming an off-gas from the reaction containing sulfur dioxide and hydrogen chloride, the improvement of mixing said off-gas with chlorine and exothermically reacting the off-gas with the chlorine to form sulfuryl chloride and introducing the sulfuryl chloride thus formed into the reaction.

7. A process as defined in claim 6 wherein said mixing of off-gas with chlorine is at a temperature below about 35° C. and said exothermic reaction is at a temperature below about 100° C. and said solvent is selected from hydrocarbon and chlorinated hydrocarbon solvents.

References Cited by the Examiner

UNITED STATES PATENTS 2,920,062   1/1960   McFarland _____ 260—79.3

FOREIGN PATENTS 802,843   10/1958   Great Britain.

JOSEPH L. SCHOFER, Primary Examiner.

J. F. McNALLY, D. K. DENENBERG,
Assistant Examiners.